United States Patent

Appleton

[15] 3,694,588
[45] Sept. 26, 1972

[54] TAKE-UP REEL
[72] Inventor: Arthur I. Appleton, 1701 Willington Ave., Chicago, Ill. 60657
[22] Filed: May 6, 1970
[21] Appl. No.: 35,153

[52] U.S. Cl. ............... 191/12.2, 242/107, 242/107.5
[51] Int. Cl. ......................... H02g 11/02, B65h 75/48
[58] Field of Search...... 242/107 R, 107.1, 107.12, 107.13, 242/107.2, 107.3, 107.5, 107.6, 107.7, 115; 185/37, 39, 45; 191/12, 12.2, 12.4

[56] References Cited

UNITED STATES PATENTS

| | | | |
|---|---|---|---|
| 3,033,488 | 5/1962 | Weber | 242/107.5 |
| 3,400,230 | 9/1968 | Becker et al. | 191/12.2 |
| 3,040,139 | 6/1962 | Appleton | 191/12.2 |
| 2,645,432 | 7/1953 | Griffitts | 242/107 |
| 3,346,705 | 10/1967 | Slinkard et al. | 242/107 X |
| 3,374,319 | 3/1968 | Stahmer | 191/12.4 |

Primary Examiner—Stanley N. Gilreath
Assistant Examiner—Werner H. Schroeder
Attorney—Wolfe, Hubbard, Voit and Osann, Ltd.

[57] ABSTRACT

A take-up reel for storing and paying out an electrical cable in which the main components of the reel have a unitized construction to facilitate assembly and disassembly of the reel. A spring motor is hinge mounted on the reel base to permit movement of the motor away from the reel drum for quick access to the drum interior. An overrunning clutch connects the spring motor shaft to the reel drum to provide a positive drive between the motor and drum during normal winding and rewinding operations, while permitting the drum to freely overrun the shaft during rewinding in the event the drum speed exceeds that of the spring motor. The clutch also provides a reliable driving connection between the spring motor and the reel drum regardless of slight errors in their alignment.

10 Claims, 21 Drawing Figures

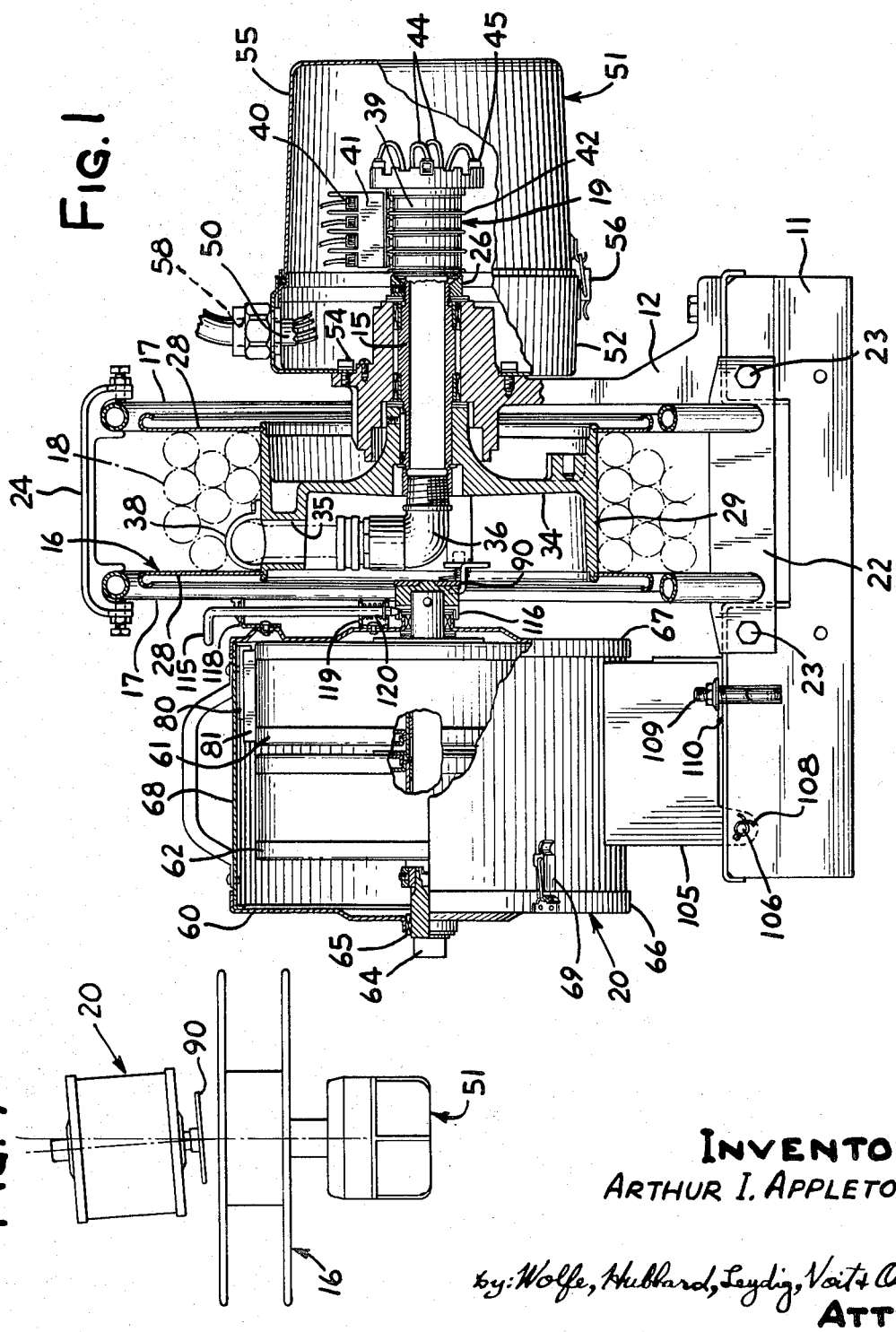

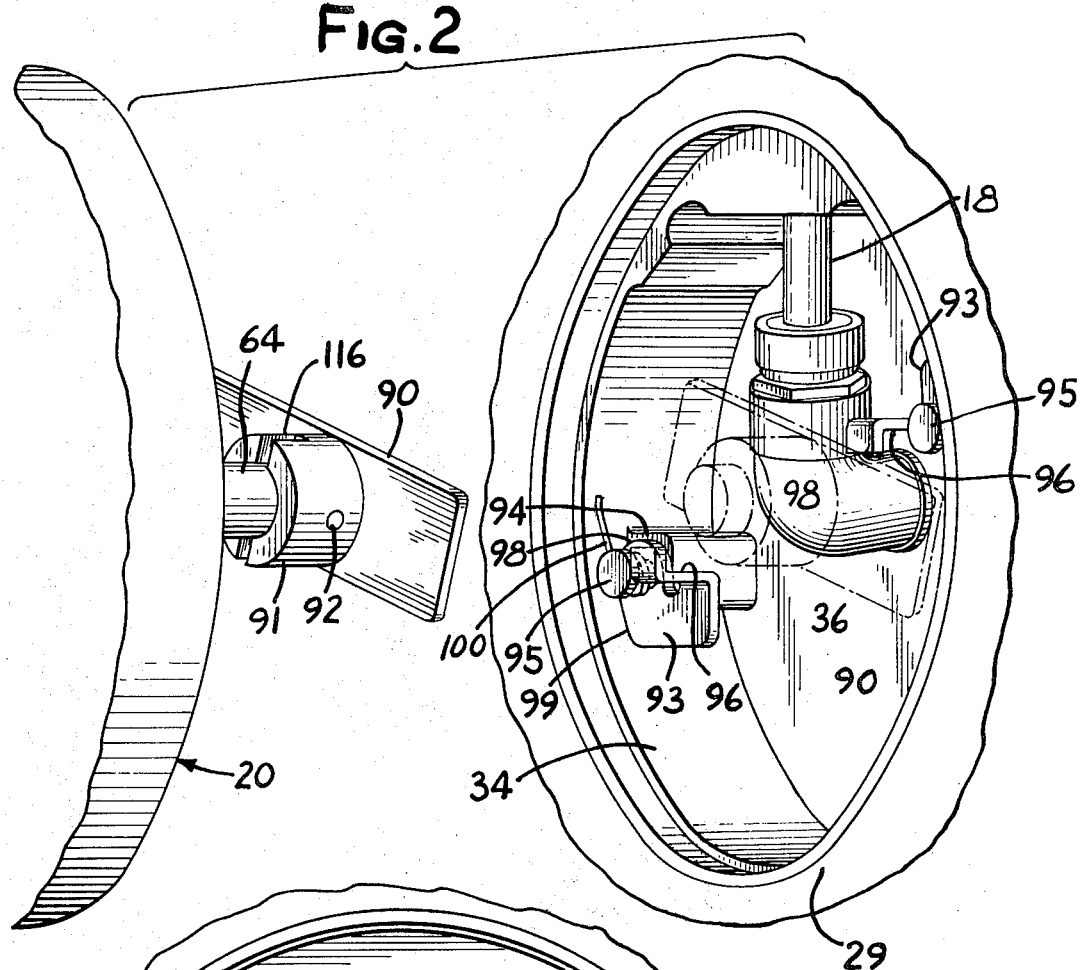
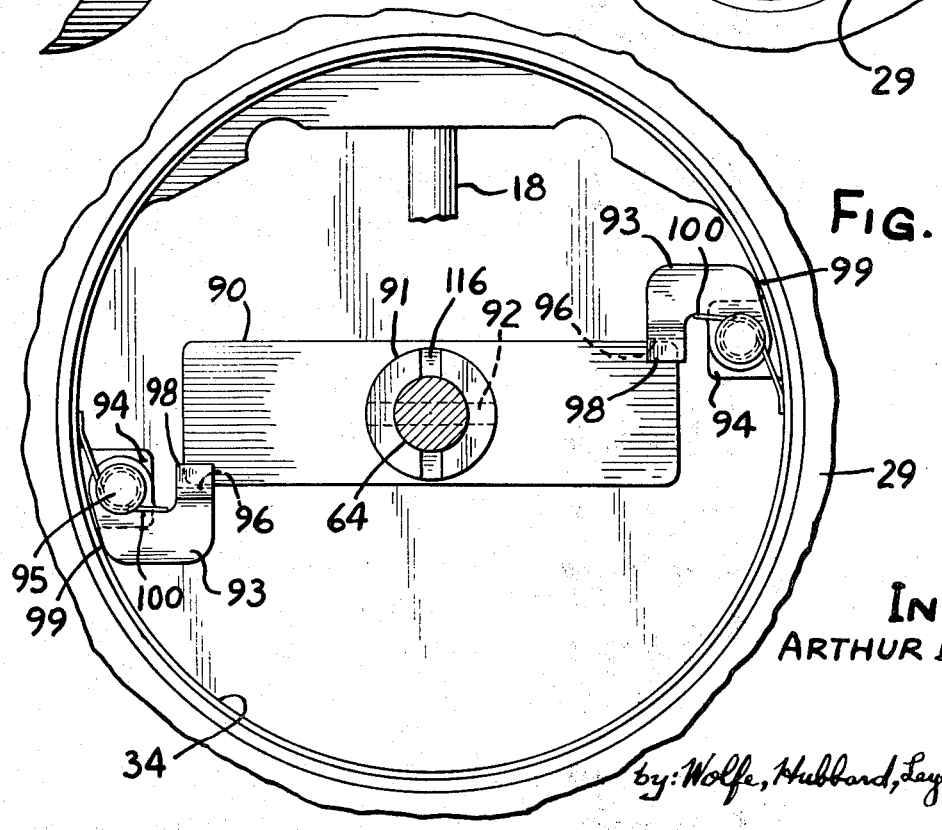

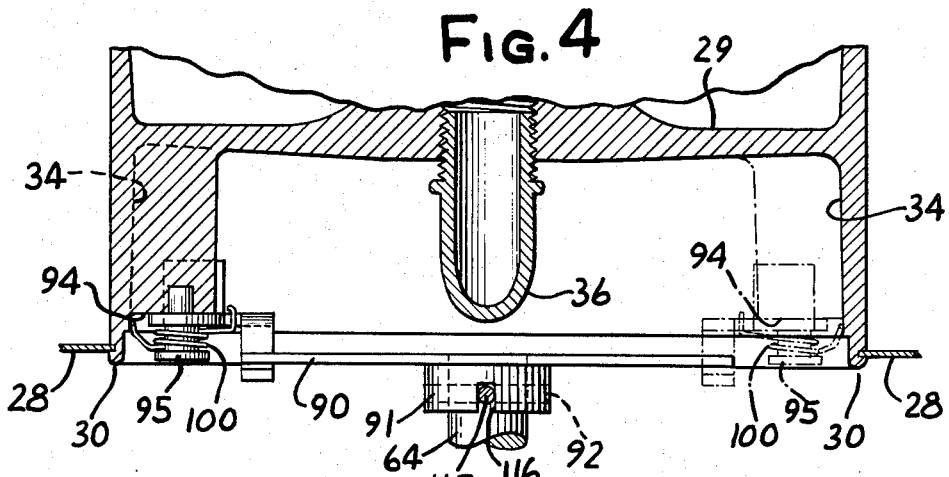
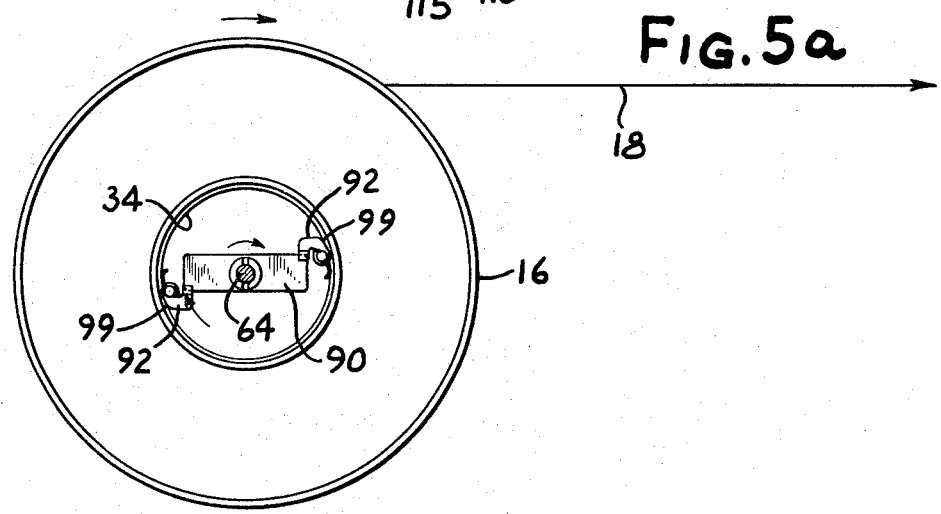
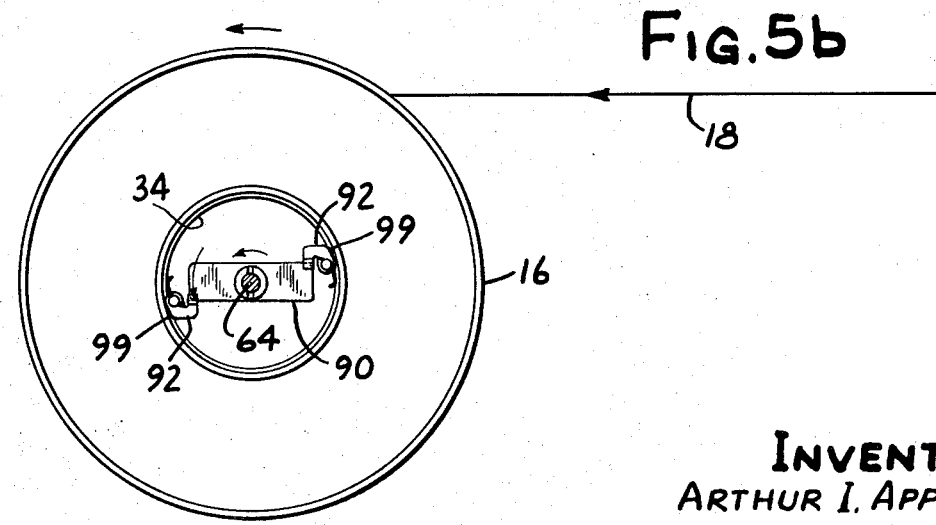
INVENTOR
ARTHUR I. APPLETON

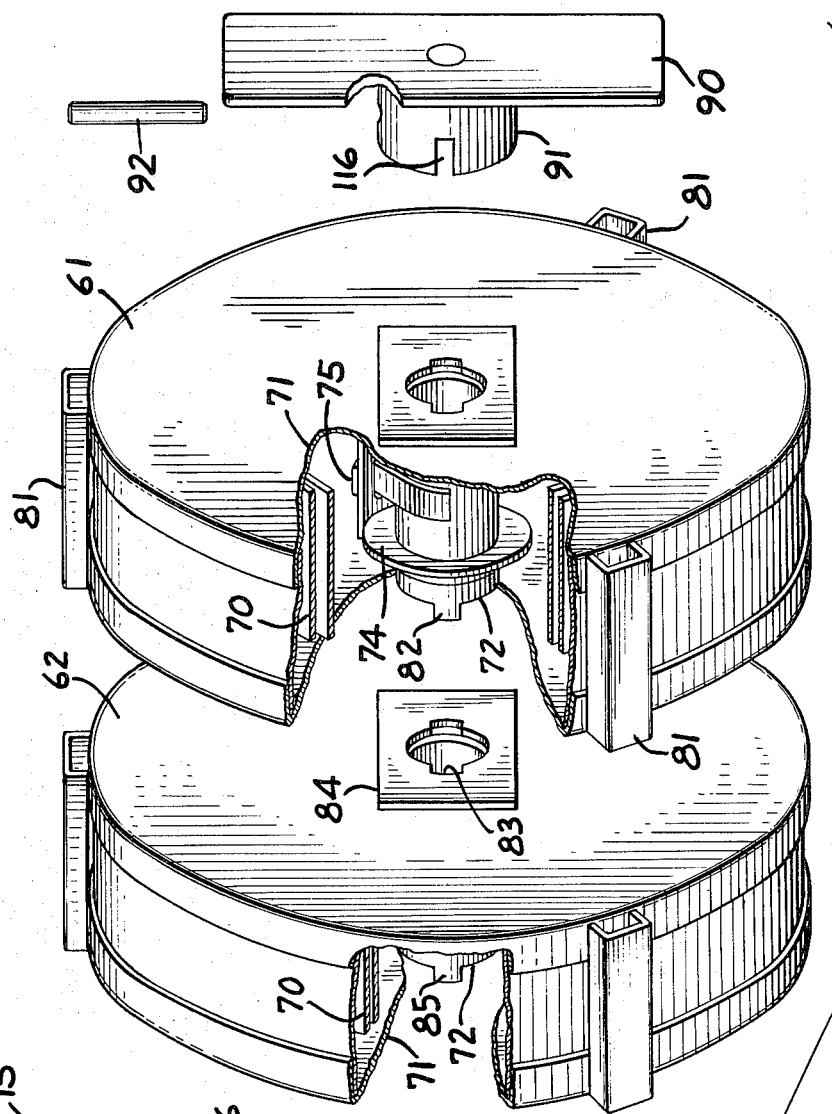
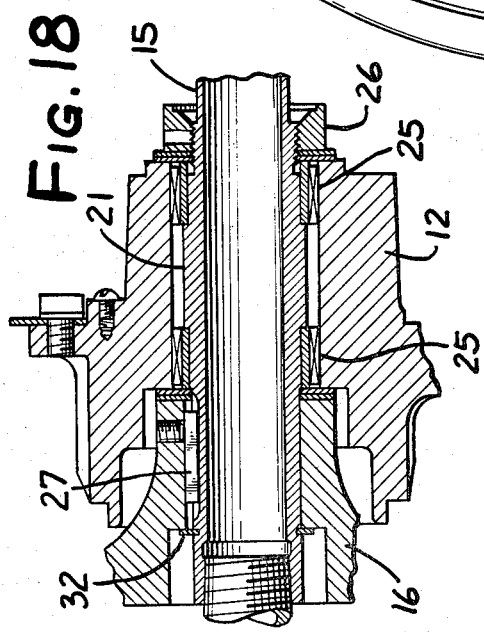
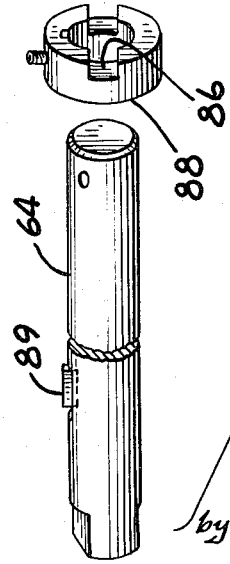

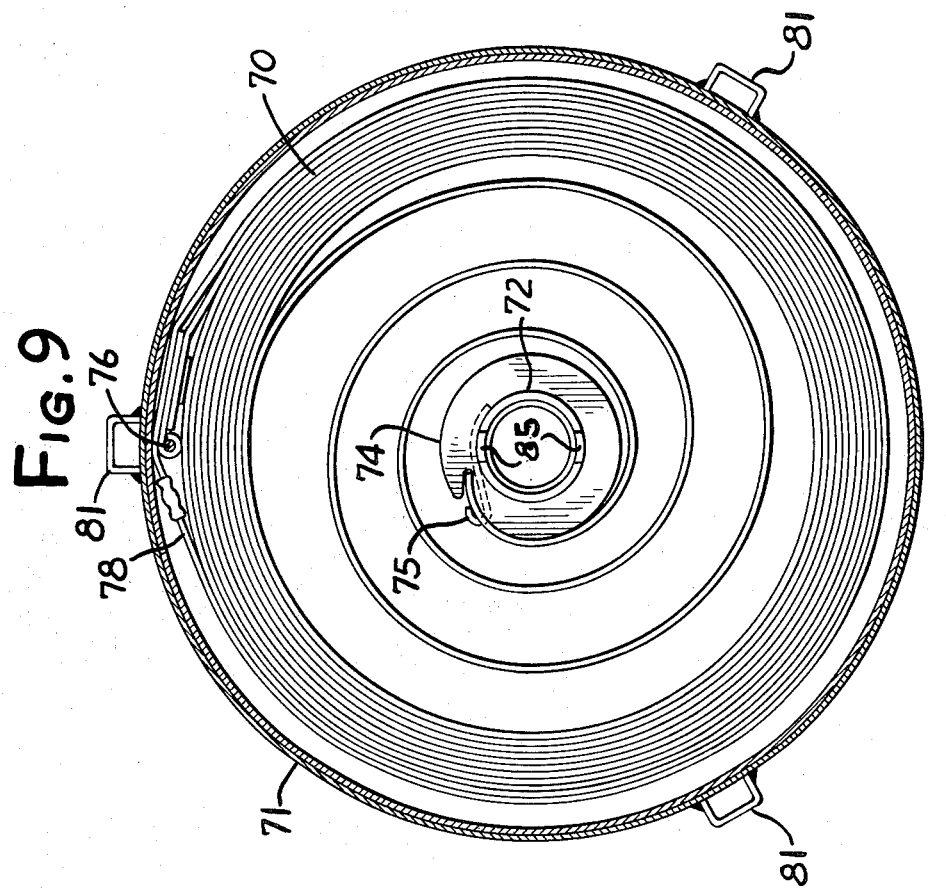
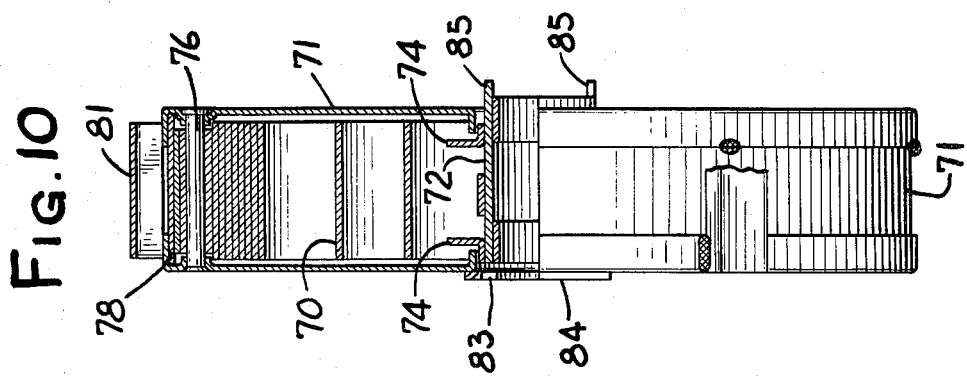

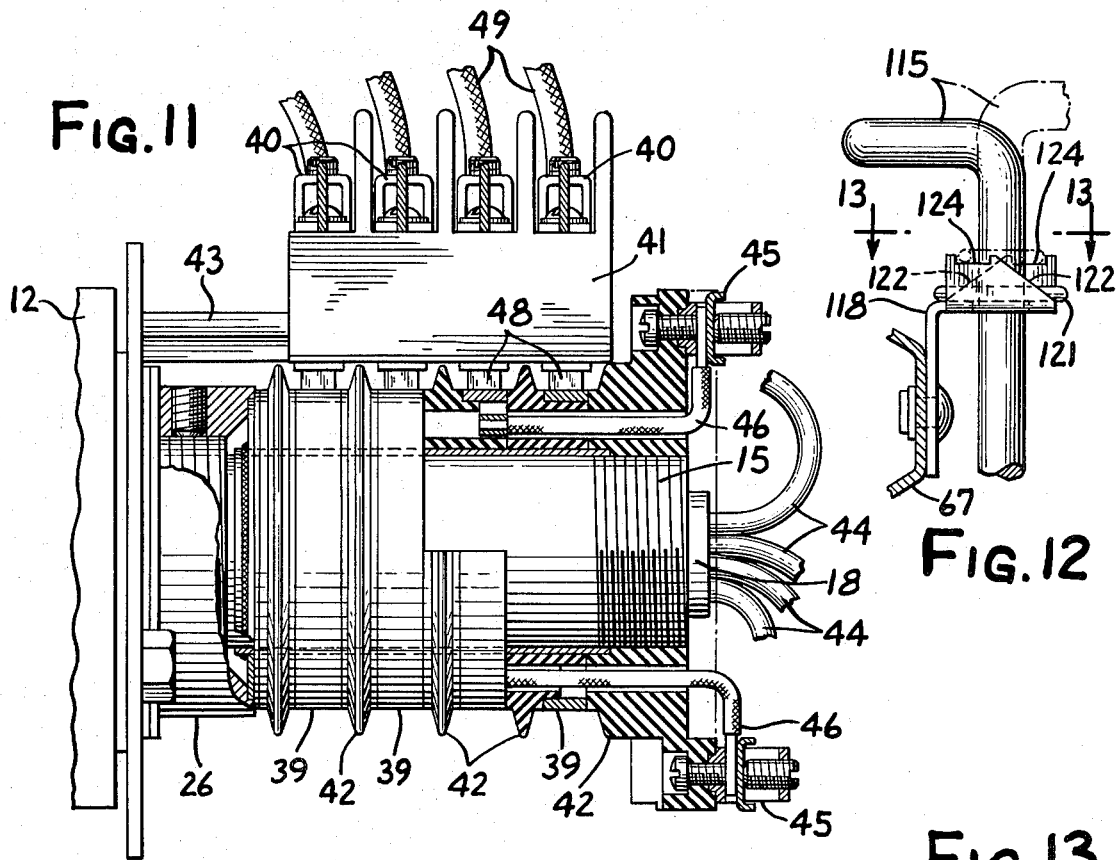
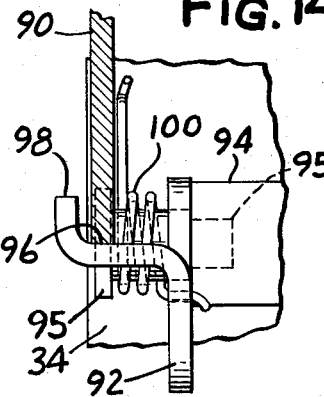
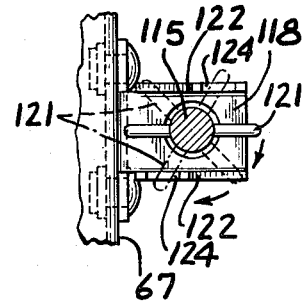
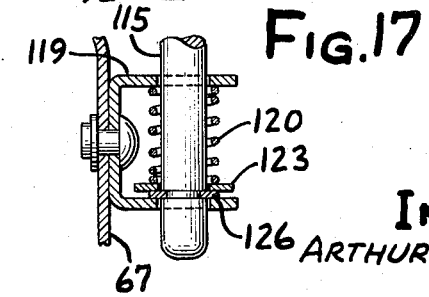

TAKE-UP REEL

The present invention relates to take-up reels for carrying utility cables and conduits such as electrical cables, extension cords, grounding cords, flexible hose and the like, which automatically wind or pay out these cables to machines moving to and from the utility source.

In present take-up reel constructions it is common practice to use coil spring motors which continually bias a reel drum toward its cable winding direction. As the cord is drawn out from the reel the power or torque which develops in the spring motor increases. If the cord is accidentally severed as sometimes occurs in construction areas or is unintentionally released while nearly completely unwound, the force of the spring motor causes the reel to rewind in an accelerating manner. During such uncontrolled rewinding of the cord, the rapidly rotating reel drum can overrun the spring motor drive shaft and reverse-wind the spring causing permanent deformation or breakage of the steel coil.

In such take-up reels, it is also common for high stressed steel spring coils to break from fatigue after use over a period of time. In fact, the coil spring generally is replaced many times during the life of the reel and conduit. The large amount of power stored in a wound spring at the time of breakage can create a serious danger in replacing the coil since portions of the spring may fly out of the housing with extreme force. In addition to the danger, replacement of the spring may be quite difficult and cumbersome, particularly if done at a construction site.

Accordingly, it is an object of the present invention to provide an improved take-up reel which creates a continual rewind bias on the reel drum when the cord is paid out of the reel, but which permits the reel to freely overrun the spring motor in the event the conduit is unintentionally released or severed so that the uncontrolled centrifugal force buildup in the rotating reel drum does not reverse-wind the spring.

Another object is to provide a take-up reel of the foregoing type which has a modular or unitized construction and is thus easily assembled or disassembled.

A related object is to provide a take-up reel of the above kind in which the spring coils of the reel are totally encased in a removable cartridge so that a broken spring may be quickly and safely replaced at a construction site or work area.

A further object is to provide such a take-up reel as characterized above in which the spring motor housing may be readily displaced to permit access to the interior of the drum for replacement or repair of the cable.

Still another object is to provide a take-up reel of the above kind which reliably operates regardless of slight errors in alignment between the unitized spring motor and the reel drum.

Other objects will become apparent as the following description proceeds, taken in connection with the accompanying drawings, wherein:

FIG. 1 is an elevation view, partly in section, of a take-up reel embodying the present invention;

FIG. 2 is a fragmentary exploded perspective showing the spring motor removed from the drum, and showing in phantom the spring motor arm engaging the drum clutch pawls;

FIG. 3 is an enlarged fragmentary section of the spring motor drive arm in engagement with drum clutch pawls, taken in the plane of line 3—3 in FIG. 1;

FIG. 4 is an enlarged fragmentary section of the reel drum;

Figure 6A:
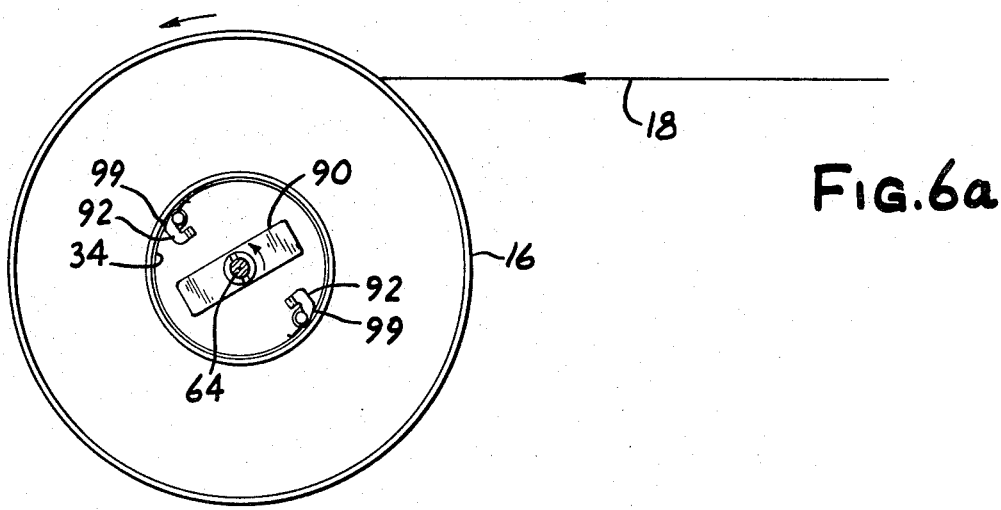
Figure 6B:
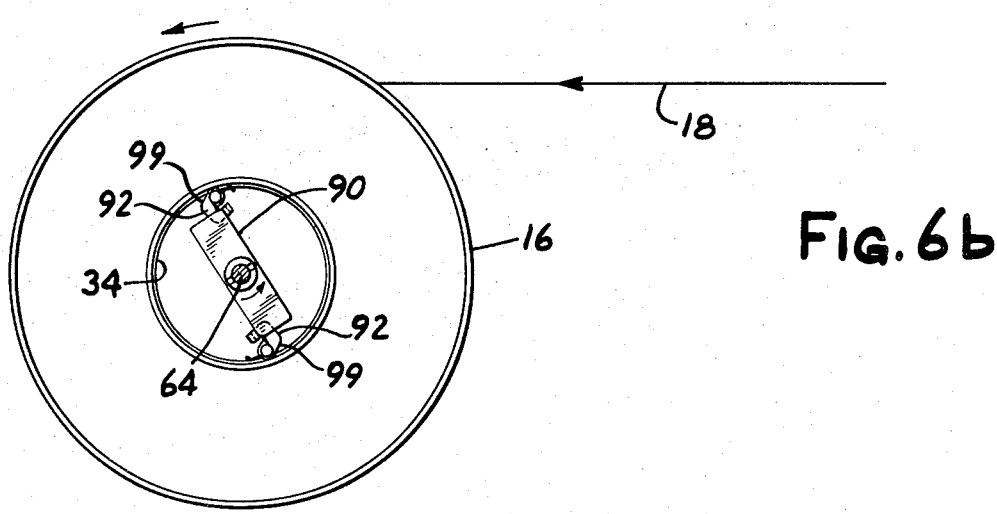
Figure 6C:
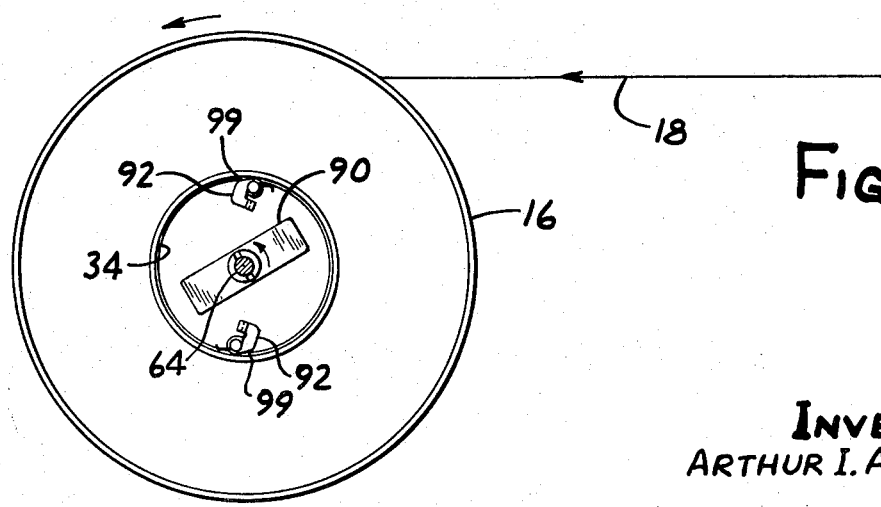

FIGS. 5a and b are diagrammatic illustrations of the relationship of the spring motor drive arm and drum of the reel drum shown in FIG. 1 during unwinding and rewinding of a conduit;

FIGS. 6a–c are diagrammatic illustrations of the operation of the overrunning clutch between the drive and drum during uncontrolled rewinding of a conduit;

FIG. 7 is a diagrammatic top view of a take-up reel illustrating the misalignment that may be tolerated in the clutch connection between the spring motor and reel drum of the present invention;

FIG. 8 is an exploded view of the spring motor cartridge and drive shaft assembly with portions cut away;

FIG. 9 is a vertical section of one of the spring motor cartridges shown in FIG. 8;

FIG. 10 is an end elevation view and partial section of the cartridge shown in FIG. 9;

FIG. 11 is an enlarged elevation view, partly in section, of the collector ring assembly included in the reel shown in FIG. 1;

FIGS. 12 and 13 are enlarged fragmentary views of the mechanism for selectively locking the spring motor shaft against rotation, with the mechanism shown in solid lines in its locking position and in phantom lines in its unlocked position;

FIG. 14 is a fragmentary section of one of the clutch mechanisms connecting the spring motor drive shaft to the reel drum;

FIG. 15 is a fragmentary section of the mechanism for releasably locking the spring motor to the reel base;

FIG. 16 is a fragmentary section showing the spun joint between the hub and sides of the reel drum;

FIG. 17 is a fragmentary view of the spring motor locking mechanism, showing the mechanism in its lowered locking position;

FIG. 18 is an enlarged section of the main reel shaft supporting the reel drum and the collector ring assembly.

While the invention is susceptible of various modifications and alternative forms, a specific embodiment thereof has been shown by way of example in the drawings and will herein be described in detail. It should be understood, however, that it is not intended to limit the invention to the particular form disclosed but, on the contrary, the intention is to cover all modifications, equivalents and alternatives falling within the spirit and scope of the invention.

Referring now to the drawings, there is shown an illustrative take-up reel embodying the present invention. In accordance with one aspect of the invention, the take-up reel has a unitized or modular construction which facilitates assembly and disassembly of the reel, both during its original manufacture and during repair and replacement of parts at a construction site. To this end, the take-up reel includes a base 11 and an upstanding bracket 12 rotatably supporting a hollow shaft 15. The bracket 12 is fixed to the base 11 by bolts 14. A reel drum 16 carrying a wound cable 18 is mounted at one end of the hollow shaft 15, and a collector ring assembly 19 connecting the cable to a power or utility supply is mounted at the other end of the shaft 15. A spring motor assembly 20 is independently mounted on the base 11 immediately adjacent the other side of the drum 16 for powering the drum to rewind cable that has been paid out from the reel.

Surrounding the reel drum 16 is a pair of guard rails 17 which are supported by brackets 22 secured to the front and back of the base by bolts 23. A tie-bar 24 connects the upper portions of the guard rails 17 to increase the structural effect of the members.

To facilitate assembly of the drum 16 and collector ring assembly 19 on the shaft 15, the shaft is formed with a large diameter central portion 21 and stepped or reduced diameter end portions, as best shown in FIG. 18. The large diameter central portion 21 is supported within the bracket 12 by appropriate anti-friction bearings 25, such as needle roller bearings. A lock nut 26 secures the shaft 15 against axial movement in one direction, and the drum 16 secured to the shaft by a retainer ring 32 prevents movement in the opposite direction. The drum 16 is keyed to the shaft 15 by a key 27.

The winding drum 16 comprises a pair of spaced circular sides 28 fixed to and held in spaced apart parallel relation by a central hub 29. To secure the sides 28 to the hub 29 without requiring bolts or other fasteners which may protrude from the drum, as shown in detail in FIG. 16, the outer edge 30 of the hub 29 is spun or folded around the mating edge of the drum side 28 to form a smooth yet secure joint. The hub 28 preferably may be made of a cast aluminum material which is readily adaptable to such a spinning or forming process.

In order to provide a passageway from the exterior of the drum 16 through the shaft 15 to the collector ring assembly 19, the drum is formed with an internal cylindrical cavity 34 and an opening 35 extending radially outward from the cavity. An elbow 36 is threadably engaged at one end of the shaft 15 so as to be in alignment with the radial opening 35. The end of the cable 18 is directed through the radial hole 35, elbow 36, and then axially through the hollow shaft 15 to the collector ring assembly. 19. A U-bolt 38 secured above the radial opening 35 directs the cable tangentially onto the drum so that the cable wraps closely around the drum as it is coiled thereon.

For the purpose of connecting the end of the cable 18 to a power source, the collector ring assembly 19, which may be of a conventional type, includes a plurality of spaced collector rings 39 mounted to rotate with the shaft 15 and a corresponding number of brush assemblies 40 mounted in a bracket 41 adjacent the collector rings. As shown in FIG. 11, the bracket 41 is fixed to the main reel bracket 12 by a support member 43. The collector rings 39 are spaced from each other by annular spacers 42 of dialectric material. The spacers and rings are mounted in series on the end of the shaft 15 and are held in place against the nut 26 by a terminal block 42 threadably engaging the extreme end of shaft 15. The cable 18 extends out of the hollow shaft 15 and its individual wires or conductors 44 are connected to respective contacts 45, which in turn are connected to the rings 39 by conductors 46. It will be appreciated that the collector rings are disposed outward from the reel so that the rings can be removed from the free end of the shaft by removing the threaded terminal block and sliding off each spacer and collector ring individually. The collector ring assembly also can be expanded by the addition of collector rings and corresponding brushes to accommodate cables having a greater or lesser number of conductors.

For providing continuous electric contact with the collector rings 39, the brush assemblies 40, corresponding in number to the contact rings, each includes a brush 48 biased into engagement with a respective collector ring 39. Each of the brushes 48 is connected to an individual conductor 49 of an inlet cable 50.

The collector ring assembly is enclosed within a housing 51 to isolate it from the atmosphere and prevent possible fire from sparks that may be generated. The housing 51 comprises a retainer portion 52 secured to a vertical flange of the bracket 12 by screws 54 and a cover 55 removably attached to the retainer portion 52 by a pair of clasps 56. An appropriate gasket may be interposed between the retainer and cover portions. The inlet cable 49 passes through an access opening 58 in the housing.

The spring motor 20, best shown in FIGS. 1 and 8–10, includes a motor housing 60 containing a series of spring cartridges 61, 62 coaxially disposed on a separate shaft 64 rotatably supported in the housing 60 by bearings 65. The housing comprises a pair of end panels 66, 67 enclosing a cylindrical body 68 and the motor shaft 64 extends a distance outwardly from each of the end panels. To permit access to the interior of the motor housing for removal or replacement of the spring cartridges, the end panel 66 is removably secured to the body 68 by clasps 69.

To facilitate removal and replacement of broken or worn springs, each cartridge 61, 62 includes a spirally wound spring 70 totally enclosed within a metal casing 71. Each spring 70 is formed of suitable spring steel and is wound about a hub 72 having a pair of spaced flanges 74 with tapered slots for receiving and guiding the inner spring end. A hook 75 secures the inner spring end to the hub 72. The other end of the spirally wound spring 70 terminates in a loop around a pin 76 held in the cartridge casing 71. To facilitate assembly of the spring cartridge during its original manufacture, an outer band 78 surrounds the spring 70.

The two spring cartridges 61, 62 in this case are connected in a series so as to have the effect of a single large spring. While two cartridges are shown in the illustrated embodiment, it will be apparent that more cartridges or a single cartridge could be used depending upon the desired power of the reel. Referring to FIGS. 1 and 8, the first cartridge 61 is mounted on the motor shaft 64 to permit rotation of the shaft relative to the hub 72 of that cartridge. The casing 71 of the first cartridge 61 is held against rotation by circumferentially spaced channels 80 secured to the motor housing body 68 and engaging corresponding lugs 81 on the cartridge 61. The inner spring end of the first cartridge 61 is in effect connected to the outer spring end of the second cartridge 62 by an appropriate coupling. In this case, the hub 72 of the cartridge 61 is formed with projections 82 which engage slots 83 formed in a drive plate 84 secured to the second cartridge 62. The hub of the cartridge 62 is formed with similar projections 85 which engage corresponding slots 86 in a lock ring 88 secured to the motor shaft 64 by a key 89. Thus, when the shaft 64 is turned, by drawing out cable as will be explained below, the shaft turns the lock ring 88 which winds the spring of the cartridge 62, the resulting spring torque turns the casing of the cartridge 62 which is not secured to the motor housing, and the drive plate 84 turns the hub of the cartridge 61 to wind the spring of that cartridge.

It can be seen that the cartridges may be quickly and safely replaced, in the event of a broken spring, by merely removing the housing end panel 60 and the lock ring 88 and slidably withdrawing the cartridges from the motor shaft 64. Alternatively, the entire spring motor assembly could be readily replaced in the field, as will be apparent below.

In accordance with another aspect of the invention, an overrunning clutch connects the spring motor shaft and the reel drum to provide a positive drive between the spring motor and drum during normal winding and rewinding operations, while preventing reverse winding and damage to the spring motor in the event the cable is accidentally severed or released causing the reel to overrun the motor during uncontrolled rewinding. In the illustrated embodiment, best shown in FIGS. 2-8 and 14, one end of the spring motor shaft 64 carries a drive arm 90 in the form of a flat plate. The drive arm 90 is mounted on a hub 91 secured to the end of the shaft 64 by a pin 92. The illustrated clutch mechanism includes a pair of diametrically opposed pawls 93, each mounted on a shoulder 94 formed in the drum cavity 34 by pin 95 for limited rotational movement. As shown in detail in FIGS. 2, 3, and 14, each pawl 93 has an arm portion which forms a flat bearing seat 96 for engaging one end of the spring motor drive arm 90. To ensure engagement with the drive arm 90, the pawl bearing seat 96 is substantially wider than the drive arm plate and a flange 98 is provided at the outer edge of the seat 96. In order to maintain the pawls in proper position for engagement with the drive arm, one side 99 of each pawl is formed so that when it abuts the wall of the cavity 34 the pawl seat is in a radially extending position. A spring 100 wound about the pawl pin 95 and having opposite ends biased between the cavity wall and the pawl tends to urge the pawl side 99 against the cavity wall.

During normal winding and rewinding of the cable 18 by the take-up reel, as illustrated in FIGS. 5a and 5b, when the cable is drawn from the take-up reel, the drum 16 is rotated in a clockwise direction with the clutch pawls 93 engaging the ends of the spring motor drive arm 90. The pawl surfaces 99 abut the wall of drum cavity 34 to prevent rotation of the pawls and thereby transmit torque from the drum 16 to the drive arm 90 to turn the drive arm in a clockwise direction and wind the spring motor 20. To rewind cable that has been paid out from the reel, the torque developed in the wound spring motor 20 causes the drive arm 90 to rotate in a counterclockwise direction when the cable is released. Since the pawl surfaces are still urged against the drum cavity wall 34 to prevent rotation of the pawls, torque is transmitted from the drive arm 90 to the drum 16 which rotates the drum. Normally, the withdrawn end of the cable 18 is held to control the rewinding.

In the event that the cable unexpectedly breaks or is unintentionally released so that the energy buildup of the rotating arm causes it to rotate faster than the unwinding spring motor drive arm or to rotate after the spring motor has completely unwound, the clutch pawls 93 permit the drum to overrun the drive arm, as shown in FIG. 6a-c. Referring to FIG. 6a, there is shown a drum in which the cable 18 is being rewound without a restraining force on the cable so that the reel drum 16 has gained momentum sufficient to cause it to rotate at a rate faster than that of the drive arm. The clutch pawls 93 thus are moved out of engagement with the drive arm 90. Continued rotation of the drum 16 at the faster rate eventually causes the reverse side of drum clutch pawls 93 to reach the slower moving drive arm 90, as shown in FIG. 6b. Still further movement of the drum relative to the drive arm causes the pawls 93 to be cammed in a counter-clockwise direction about their retainer pins 95 against the force of the biasing springs 100, thus permitting the pawls to overrun the drive arm to the position shown in FIG. 6c. It can be seen that such overruning clutch action prevents reverse winding of the spring which could otherwise cause breakage or damage to the spring.

In keeping with the invention, the spring motor is displaceably mounted on the take-up reel base for easy movement with respect to the winding drum to permit access to the interior of the drum. To this end, the motor housing 60 is provided with a mounting bracket 105 fixed to the under side thereof. In the illustrated embodiment, the bracket 105 is hinge mounted to the base 11 by a hinge shaft 106 passing through the base 11 and depending sides of the bracket 105. Cotter pins 108 secure the hinge shaft in position. Tilting of the motor 20 about the hinge shaft 106 thereby permits ready access to the drum cavity 34 for replacing the cable 18 or for other repair work. To readily secure the spring motor 20 in place on the base when the reel is to be used, additional releasable fasteners may be employed. In the illustrated case as shown in FIGS. 1 and 15, an eye bolt 109 rotatably attached to the base 11 secures an outwardly extending horizontal flange 110 of the motor housing bracket 105. A flange nut 111 on the eye bolt 109 may be readily removed to permit rotation of the eye bolt to the position shown in phantom in FIG. 15, thereby allowing the spring motor 20 to be tilted about its hinge joint. The displaceable independent mounting of the motor on the base not only facilitates easy access to the drum, but also permits quick replacement of the entire motor in the field as an alternative to changing the spring cartridges. Such replacement may be effected by merely removing the hinge cotter pins 108 and shaft 106.

It will be appreciated that even though the unitized and independently mounted spring motor 20 is assembled somewhat out of axial alignment with the wind-up drum 16, as illustrated in FIG. 7, a reliable driving engagement will be effected between the drum and motor. Since the clutch pawl bearing surfaces 96 are substantially wider than the drive arm 90, proper engagement results regardless of such slight misalignment. As a result, manufacturing tolerances of the unit may be less strict and assembly of the units more rapid.

To prevent rotational movement of the drive arm 90 from torque exerted by the spring motor when the motor is tilted out of engagement with the drum, means are provided for selectively locking the motor shaft 64. In this case, the locking means includes a rod 115 adapted to engage one of a plurality of circumferentially spaced radial slots 116 in the drive arm hub 91, shown in FIGS. 1 and 8. The locking rod 115 is supported for axial movement by an upper bracket 118 and a lower channel shaped bracket 119, both rigidly secured to the end 67 of the spring motor housing 60. When the rod 115 is in a lowered position, shown in solid lines in FIGS. 12 and 13, it engages the motor shaft hub. When in a raised position, shown in phantom in FIGS. 12 and 13, it is free of engagement with the motor shaft.

The locking rod 115 is continually biased in a downward direction by a spring 120 interposed between an upper leg of the channel bracket 119 and a washer 123 abutting a snap ring 126 through the rod 115, as shown in FIG. 17. To effect vertical movement of the rod against the force of the spring 120, a cam pin 121 extends transversely through an upper portion of the rod 115 and cooperates with inclined cam surfaces 122 of the upper bracket 118. Rotational movement of the locking rod 115 causes the pin 121 to be cammed upward along the surfaces 122 until it engages a pair of recessed seats 124, where it remains during normal use of the reel. When the drive arm is to be secured against rotational movement, locking rod 115 may be lifted vertically so that the cam pin 121 is removed from the seats 124 and rotated until it is disposed over the cam surfaces which guide the locking rod into engagement with the hub slots 116.

In view of the foregoing, it can be seen that the take-up reel of the present invention provides a positive drive between the spring motor and wind-up drum during normal winding and rewinding operations, while preventing reverse winding and damage to the spring motor in the event rotational momentum of the drum overruns the spring motor. In addition, the take-up reel has a unique modular construction which is easily and safely assembled and disassembled in the field to permit repair or replacement of parts.

I claim as my invention:

1. A take-up reel for storing and paying out a cable, comprising in combination,
   a base,
   a support bracket mounted on said base,
   a shaft rotatably supported by said bracket,
   a drum upon which said cable may be wound, said drum being formed with an internal cavity and being mounted at one end of said shaft with said shaft extending only partially into said cavity,
   a collector ring assembly mounted at the other end of said shaft electrically connecting one end of said cable to a power source,
   a spring motor assembly independently mounted on said base adjacent said drum, said spring motor assembly including a housing, a separate shaft rotatably mounted in said housing, and at least one spring cartridge removably positioned on said shaft and operatively connected thereto,
   said spring motor shaft having an end extending axially into said internal drum cavity, means connecting said spring motor shaft end with the walls of said drum cavity for driving said drum to rewind cable that has been paid out, and
   said spring motor being displaceable from a position wherein said spring motor shaft is in driving engagement with said drum cavity walls to a position out of engagement with said drum for permitting access to said drum cavity.

2. The take-up reel of claim 1 in which said spring motor housing is hinge mounted on said base to permit tilting movement of said motor and access to said drum interior.

3. The take-up reel of claim 1 in which said spring cartridge includes a wind-up spring totally enclosed within a casing, said wind-up spring having one end connected to said spring motor shaft and the other end connected to said casing, said cartridge being restricted against rotation by said motor housing, and said motor housing having a removable end panel to permit replacement of said cartridge.

4. The take-up reel of claim 1 in which said spring motor includes a plurality of spring cartridges connected together in a series, each spring cartridge including a wind-up spring totally enclosed within a casing, and, said housing having a removable end panel to permit replacement of said cartridges.

5. The take-up reel of claim 1 in which said connecting means between said spring motor shaft end and said drum cavity walls includes a clutch means capable of providing a positive coupling between said motor shaft and drum cavity walls when said drum is rotated by paying out said cable while permitting a free overrunning of said drum with respect to said shaft incident to rotation of said drum in the opposite direction.

6. The take-up reel of claim 1 in which said drum comprises a hub and a pair of spaced circular panels, and said hub has edges which are in folded over clamping engagement with mating edges of said sides to secure said sides to the hub.

7. A take-up reel for storing and paying out an electrical cable comprising in combination,
   a base,
   a support bracket mounted on said base,
   a shaft rotatably supported by said bracket,
   a drum upon which said cable may be wound mounted at one end of said shaft for rotation therewith, said drum being formed with an internal cavity,
   a collector ring assembly mounted at the other end of said shaft electrically connecting one end of said cable to a power source,
   a spring motor assembly separately mounted on said base adjacent said drum for driving said drum to rewind cable that has been paid out, said spring motor including a separate rotatable shaft having one end extending axially into the interior of said internal drum cavity and having a radially extending drive arm secured thereto,
   clutch connecting means between said spring motor shaft end and said drum, said clutch connecting means including a plurality of spring biased pawls mounted within said drum cavity at circumferentially spaced intervals, said pawls engaging said motor shaft drive arm to positively couple said motor shaft and drum to wind said spring motor when said drum is rotated by paying out cable, and said pawls being biased out of engagement with said drive arm to permit free overrunning of said drum with respect to said shaft and drive arm incident to drum rotation in the opposite direction.

8. The take-up reel of claim 7 in which said clutch pawls each have an arm portion engageable with said spring motor drive arm, said pawl arms being substantially wider than the width of said drive arm to permit driving engagement of said arms regardless of slight errors in alignment between said spring motor and said drum.

9. A take-up reel for storing and paying out a cable, comprising in combination,
a base,
a support bracket mounted on said base,
a shaft rotatably supported by said bracket,
a drum upon which said cable may be wound mounted at one end of said shaft for rotation therewith,
a collector ring assembly mounted at the other end of said shaft electrically connecting one end of said cable to a power source,
a spring motor assembly independently mounted on said base adjacent said drum, said spring motor assembly including a housing, a separate shaft rotatably mounted in said housing, and at least one spring cartridge axially positioned on said shaft and operatively connected thereto,
said spring motor shaft having an end extending axially into the interior of said drum for driving said drum to rewind cable that has been paid out,
said spring motor being displaceable from a position wherein said spring motor shaft is in driving engagement with said drum to a position out of engagement with said drum for permitting access to said drum interior, and
means for locking said spring motor shaft against rotation when said motor is displaced relative to said drum.

10. The take-up reel of claim 9 in which said locking means includes a hub having a plurality of circumferentially spaced radial holes mounted on said spring motor shaft, and a locking rod supported for radial movement with respect to said hub and selective engagement with said holes.

* * * * *